United States Patent [19]

Konno

[11] Patent Number: 5,499,714
[45] Date of Patent: Mar. 19, 1996

[54] TAPE CASSETTE CONTAINER CASING

[75] Inventor: Toshikazu Konno, Miyagi, Japan

[73] Assignee: Sony Corporation, Tokyo, Japan

[21] Appl. No.: 284,173

[22] Filed: Aug. 2, 1994

[30] Foreign Application Priority Data

Aug. 20, 1993 [JP] Japan .................. 5-206703

[51] Int. Cl.⁶ .................. B65D 85/672
[52] U.S. Cl. .................. 206/387.13; 206/387.1; 206/493
[58] Field of Search .................. 206/387.1, 387.13, 206/45.14, 493

[56] References Cited

U.S. PATENT DOCUMENTS

| | | | |
|---|---|---|---|
| 4,248,345 | 2/1981 | Bowers | 206/387.1 |
| 4,365,711 | 12/1982 | Long et al. | 206/387.13 |
| 4,512,470 | 4/1985 | Sieben | 206/387.1 |

FOREIGN PATENT DOCUMENTS

| | | |
|---|---|---|
| 0136753 | 4/1985 | European Pat. Off. . |
| 0229419 | 7/1987 | European Pat. Off. . |
| 4239486 | 8/1992 | Japan .................. 206/387.1 |
| 2022555 | 12/1979 | United Kingdom . |
| 2159497 | 12/1985 | United Kingdom . |

*Primary Examiner*—David T. Fidei
*Attorney, Agent, or Firm*—Ronald P. Kananen

[57] ABSTRACT

A tape cassette container casing includes a casing main member having a tape cassette housing recess for housing a tape cassette and a lid formed as one with the casing main member via a hinge. The tape cassette housing recess has a reel holding protrusion formed on its bottom surface. The reel holding protrusion is engaged in a reel hole of a tape cassette for inhibiting idle rotation of a tape reel having a magnetic tape wound on it. A protrusion is formed at a position on the bottom surface of the tape cassette housing recess of the casing main member registering with a mouth portion of the tape cassette for delimiting the loading direction of the tape cassette. With the tape cassette container casing, the lid may be closed onto the casing main member only when the tape cassette is housed in the correct position for preventing damages to the magnetic tape.

5 Claims, 6 Drawing Sheets

5,499,714

TAPE CASSETTE CONTAINER CASING

BACKGROUND OF THE INVENTION

This invention relates to a container casing for a tape cassette for a tape recorder or a video tape recorder.

In general, a tape cassette for an audio tape recorder or a video tape recorder is contained in a box-shaped tape cassette container casing of carton board paper or synthetic resin, such as polypropylene or polyethylene, opened at one end, or a tape cassette container casing of the same material as above, made up of a main casing member having upstanding outer wall sections defining a housing compartment for the tape cassette and a lid which may be folded over the main casing member at a hinge formed as one with the casing main member.

On the other hand, the tape cassette for professional use is increased in size in order to enable long-time recording. For example, the tape cassette for digital recording/reproduction has an outer size of 366 mm×206 mm×33 mm and a correspondingly increased weight. The box-shaped container casing for housing such large-sized tape cassette is difficult to transport manually. Besides, the tape cassette contained therein cannot be expected to be protected against impacts caused by possible descent.

Consequently, as a tape cassette container casing for containing the large-sized tape cassette, there has been provided a carrying-case type hard casing comprised of a casing main member of hard synthetic resin having a tape cassette housing recess and a lid which may be folded via a hinge onto the casing main member.

Referring to FIG. 3, a tape cassette container casing 10 includes a casing main member 11 having a rectangular tape cassette containing recess 12 having an opening size substantially equal to the outer size of a tape cassette 1 as later explained, and a flexible hinge 13 formed as one with the casing main member 11 by reducing the thickness of an opened lateral surface section of the casing main member 11. The tape cassette container casing 10 also includes a lateral surface section 14 connecting to the hinge 13 and constituting the open lateral surface section and a lid 16 connecting to the lateral surface section 14 via a second flexible hinge 15 of a reduced thickness. The lid 16 has a tape cassette housing recess 17 having an opening size substantially equal to the outer size of the tape cassette 1.

The lateral surface section of the casing main member 11 opposite to the opened lateral section connecting to the first hinge 13 is formed as one with an engagement section 19 via a flexible third hinge 18 of a reduced thickness. The lateral surface section of the lid 16 opposite to the lateral surface section formed as one with the second hinge 15 is formed a one with a mating engaging section 20 having a wedge-shaped cross-section. The lid 16 is folded over and abutted against the casing main member 11 via the hinges 13, 15 and the engagement section 19 is engaged with the mating engagement section 20 for maintaining the mutually engaged state between the casing main member 11 and the lid 16.

The bottom section of the tape cassette container recess 12 of the casing main member 11 is formed with a pair of upstanding reel holding protrusions 21A, 21B in a spaced apart relation along the longer side of the casing main member 11. The bottom surface of the tape cassette housing recess 17 of the lid 16 is formed with a pair of reel retention bosses 22A, 22B in association with the reel retention protrusions 21A, 21B, respectively. When the tape cassette 1 is housed in the tape cassette housing recess 12, the reel holding protrusions 21A, 21B are engaged in reel holes 4a, 4b of the tape cassette 1 for inhibiting idle rotation of the tape reels 4A, 4B, respectively. When the lid 16 is closed against the casing main member 11, the reel retention bosses 22A, 22B are caused to bear against the reel holder of the tape cassette 1 for inhibiting floating of the tape cassette 1.

The tape cassette 1 shown in FIG. 5 is housed in the above-described tape cassette container casing 10. The tape cassette 1 is a D-1 or D-2 type tape cassette for professional use which is capable of digital recording and which is comprised of a cassette casing 2 made up of upper and lower cassette halves and a pair of tape reels 4A, 4B which is rotatably mounted within the cassette casing 2 and on the outer surfaces of which a magnetic tape 3 is wound. A pair of guide holes 5A, 5B via which the reel holes 4a, 4b of the tape reels 4A, 4B are exposed to outside are bored in the bottom surface of the cassette casing 2, while a cassette lid 8 is removably mounted on one of the lateral surfaces of the cassette casing 2. In the present specification, the lateral surface on which the cassette lid 6 is mounted and the lateral surface opposite thereto are termed a front side and a rear side, respectively.

The tape cassette 1 is loaded in position on a loading portion of a recording/reproducing apparatus, not shown, with the aid of positioning openings 7A, 7B bored in the bottom surface of the cassette casing 2. When the recording or playback operation of the recording/reproducing apparatus is to be performed, an unlock lever of an unlock mechanism of the recording/reproducing apparatus is engaged in unlock grooves 2a, 2b on the bottom surface of the cassette casing 2 for disengaging a tape reel lock mechanism, not shown, and for causing rotation of the cassette lid 6 of the front side of the tape cassette 1. After rotation of the cassette lid 6, a tape guide member of a tape loading mechanism is intruded into a substantially T-shaped guide groove 8 formed in the bottom surface of the cassette casing 2 for reeling out the magnetic tape 3 from the tape reels 4A, 4B for loading the tape on a cylinder, a stationary head or on a capstan, by way of performing a loading operation.

A rectangular void space via which a tape guide member of the recording/reproducing apparatus constituting the tape loading mechanism is intruded, that is a mouth portion 9, is formed on the back surface of the cassette lid 6 in continuation to the sector-shaped foremost part of the guide groove 8.

The mouth portion 9 is of a variable shape depending on different design statements of the tape cassettes. Thus the mouth portion 9 is rectangular with the D-1 or D-2 tape cassettes, while it is trapezoidal void spacing, having the side of the cassette lid 6 as a long side, with the beta-cam type tape cassette 1A for business use which enables analog recording, as shown for example in FIG. 6. The mouth portion 9 is a substantially rectangular void spacing with a M-2 type tape cassette 1B for business use which enables analog recording shown in FIG. 7.

With a video tape cassette for household use, the mouth portion 9 is of different contours depending on different design statements. With a VHS tape cassette, shown in FIG. 9, and with a U standard type tape cassette 1E, shown in FIG. 10, the mouth portion is formed as a void space having the shape of a modified rectangle and as a substantially triangular void space, respectively.

If, with the tape reel 1, the tape reels 4A, 4B are rotated with idle movement, the magnetic tape 3 wound on the peripheral surfaces of the tape reels 4A, 4B is reeled out and becomes flexed or otherwise becomes unstable in winding pressure. In addition, the magnetic tape tends to be pinched by the cassette lid 6 etc. to cause damages to the magnetic tape 3.

Thus, with the tape cassette 1, the reel holding protrusions 21A, 21B are engaged in the reel holes 4a, 4b of the tape reels 4A, 4B for accommodating the tape cassette 1 in the tape reel containing recess 12 in order to prevent the tape reels 4A, 4B from performing idle rotation. Specifically, plural rib engagement grooves 21a, 21b are formed on the peripheral surfaces of the reel holding protrusions 21A, 21B, respectively, as shown in FIG. 3. These rib engagement grooves are engaged by ribs 4c, 4d formed on the tape holes 4a, 4b of the tape reels 4A, 4B for preventing idle movement in the rotating direction of the tape reels 4A, 4B.

It is noted that, while the tape cassette 1 has different contours of the mouth portion 9 depending on the different design statements, the tape cassette 1 has a length L from the center O of the reel holes 4a, 4b of the tape reels 4A, 4B to its front side which is different from a length M from the center O to its rear side. The cassette container casing 10 has its casing main member 11 designed to conform to such constitution of the tape cassette 1.

That is, the casing main member 11, having the tape cassette containing recess 12 having an opening size substantially equal to the outer size of the tape cassette 1, accommodated therein, has a distance L' from the center of each of the reel holding protrusions 21A, 21B on the bottom surface of the tape cassette holding recess 12 as far as its lateral surface section formed with the hinge 13 substantially equal to the length L from the center of each of the reel holes 4a, 4b of the tape cassette 1 as far as the front surface section of the cassette casing 2. In addition, the casing main member 11 has a length M' from the center of each of the reel holding protrusions 21A, 21B as far as its lateral surface formed with the hinge 18 substantially equal to the length M from the center of the reel holes 4a, 4b as far as the rear surface section of the cassette casing 2.

With the above constitution of the tape cassette 1 and the tape cassette container casing 10, it is necessary to take into account the orientation of the tape cassette 1 when accommodating the tape cassette 1 in the tape cassette housing recess 12 or 17.

For example, if the tape cassette 1 is contained in the tape cassette container casing 10 in the inverted fore-and-aft orientation, the reel holding protrusions 21A, 21B on the bottom surface of the tape cassette containing recess 12 are not engaged with the reel holes 4a, 4b of the tape reels 4A, 4B, with the rims of the reel holes riding on the uppermost portions of the reel holding protrusions 21A, 21B.

If the user is unaware of the mistaken fitting state and causes the lid 16 to be closed with the lid 16 bearing against the casing main member 11, the tape reels 4A, 4B are uplifted by the reel holding protrusions 21A, 21B, respectively. Thus the tape reels 4A, 4B become deformed with their flange parts being thrust against the inner surface of the upper cassette half of the cassette casing 2. With the flange parts of the tape reels 4A, 4B thus deformed, the magnetic tape 3 wound about the peripheral surfaces of the tape reels 4A, 4B has its edges distorted or crushed to produce a tape edge damage.

SUMMARY OF THE INVENTION

It is therefore a principal object of the present invention to provide a tape cassette container casing in which the lid is allowed to be closed only when the tape cassette is accommodated in a correct state in the tape cassette container section, thereby preventing damage to the magnetic tape.

A tape cassette container casing of the present invention comprises a casing main member having a tape cassette housing recess formed therein for housing a tape cassette and a lid formed as one with the casing main member via a hinge. The tape cassette housing recess having a reel holding protrusion is formed on its bottom surface, with the reel holding protrusion being engaged in a reel hole of the tape cassette for inhibiting idle rotation of a tape reel having a magnetic tape wound on its peripheral surface. A protrusion is formed at a position on the bottom surface of the tape cassette housing recess of the casing main member registering with a mouth portion of the tape cassette for delimiting the loading direction of the tape cassette.

The protrusion formed on the bottom surface of the tape cassette housing recess is similar in profile to the mouth portion of the tape cassette.

With the above-described tape cassette container casing according to the present invention, a tape cassette housing recess having an opening size substantially equal to the outer size of a tape cassette housed within the main casing member is formed in the casing main member, and the reel holding protrusion is correctly engaged in the reel hole under guidance by the mistaken housing inhibiting protrusion for positively housing the tape cassette in the tape cassette housing section. Thus it becomes possible to prevent idle rotation of the tape reel and hence to prevent tape damage caused by slackened magnetic tape or by the magnetic tape being pinched by the cassette lid or the like.

The mistaken housing inhibiting protrusion formed on the bottom surface of the tape cassette housing section is allowed to be engaged in the mouth portion of the tape cassette only when the tape cassette is housed under the normal state within the tape cassette housing section to permit the tape cassette to be loaded in position in the tape cassette housing section.

In addition, the mistaken housing inhibiting protrusion, formed with substantially the same profile as the mouth portion, cooperates with the reel holding protrusion engaged in the reel hole for positively holding the tape cassette housed within the tape cassette housing recess. This prevents the tape cassette from being wobbled within the tape cassette housing recess and being abraded against the wall surface of the tape cassette housing recess or the cassette casing to produce chips which tend to become affixed to the magnetic tape surface.

DESCRIPTION OF THE PREFERRED EMBODIMENTS

Figure 1:
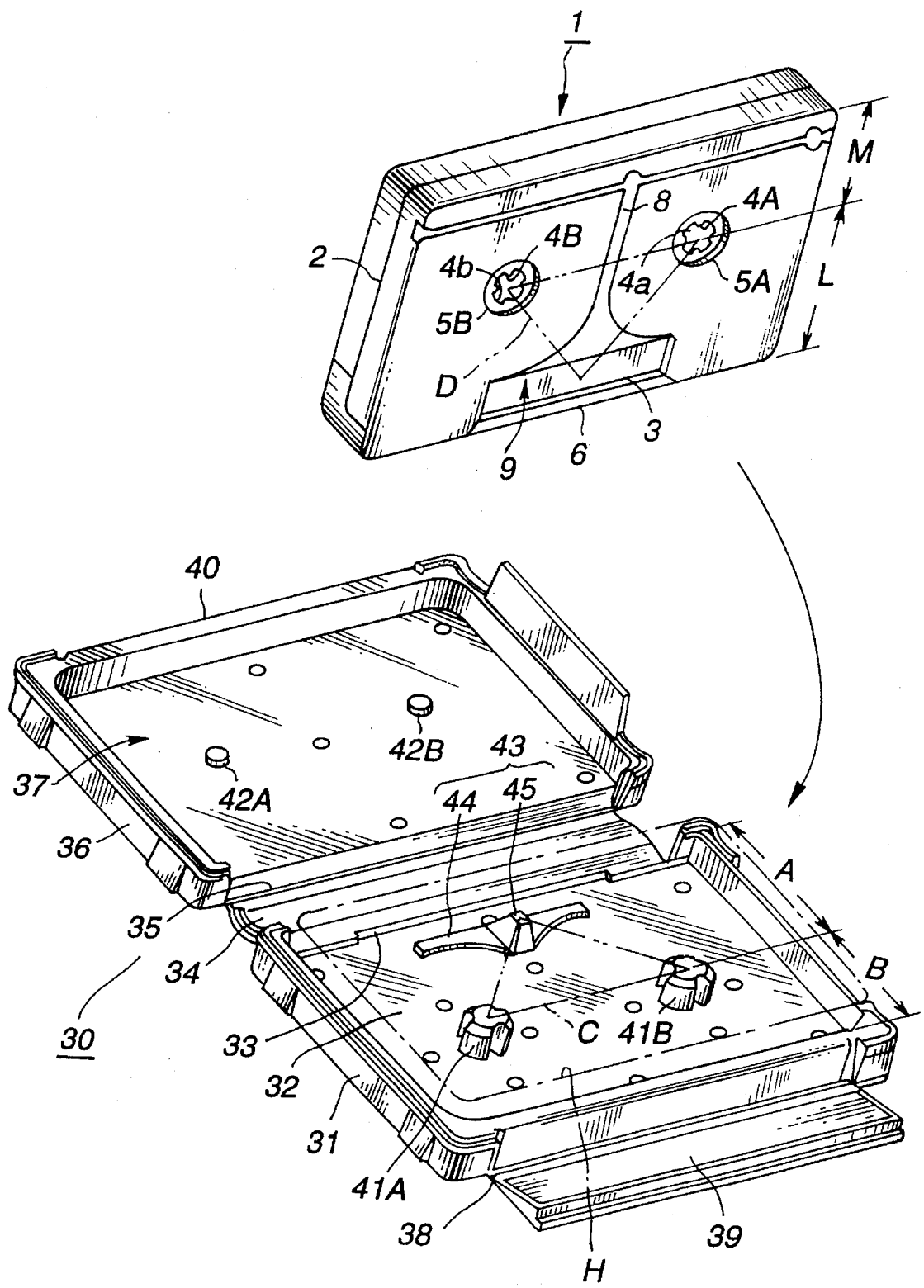
FIG. 1 is a developed perspective view showing a tape cassette container casing containing a D-1 tape cassette for business use according to the present invention.
Figure 2:
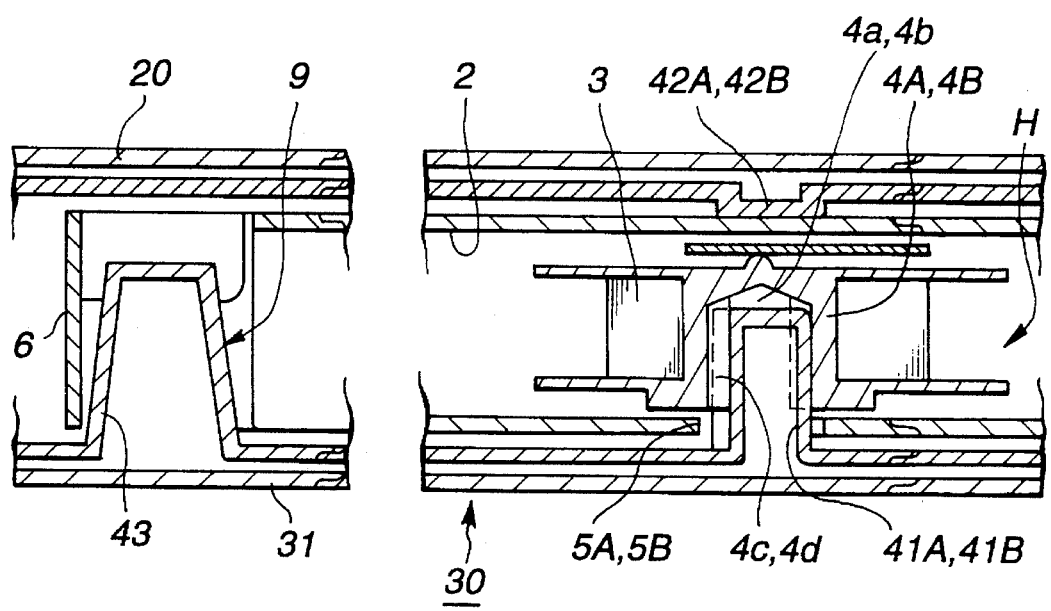
FIG. 2 is a schematic longitudinal cross-sectional view showing the tape cassette container casing shown in FIG. 1.
Figure 3:
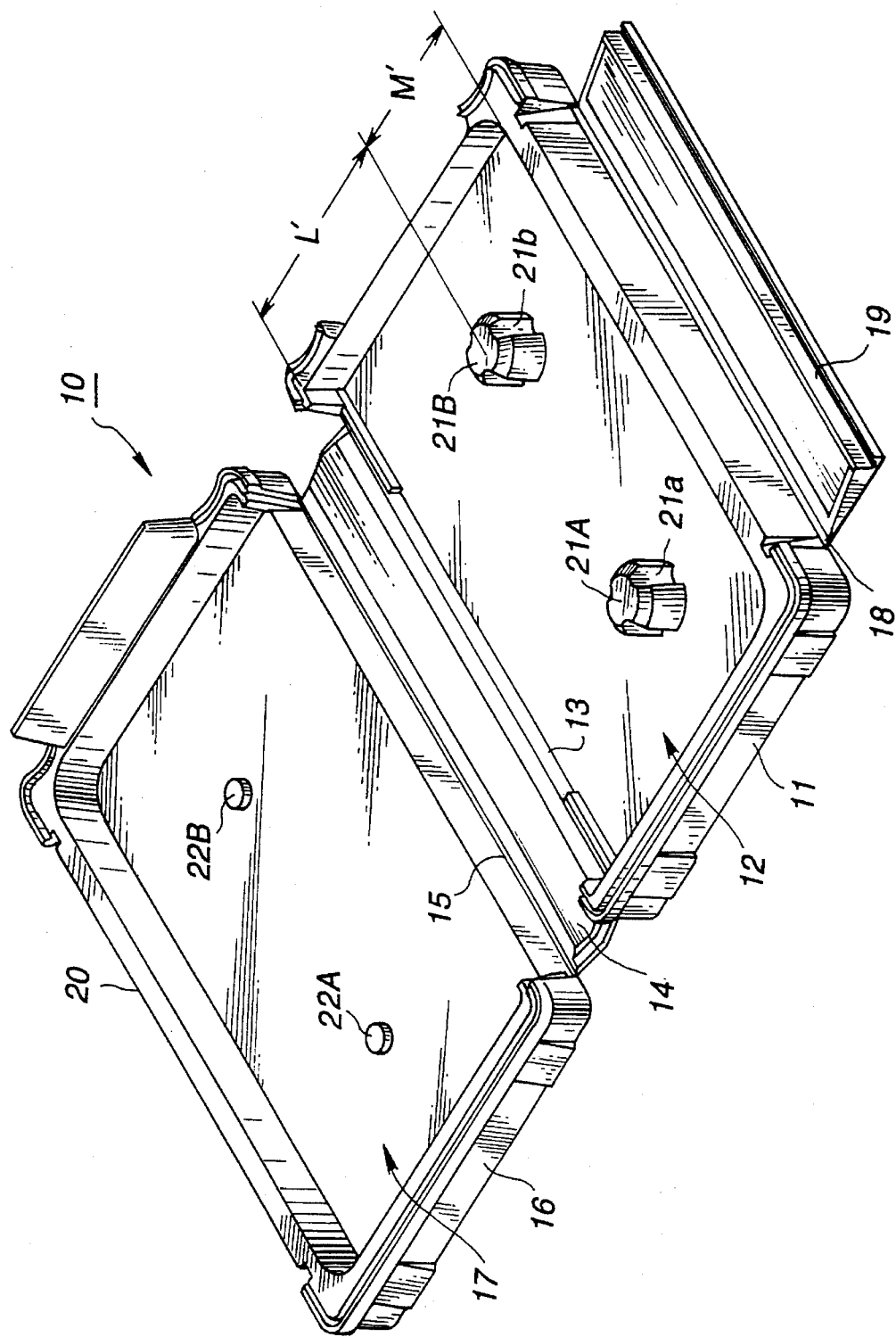
FIG. 3 is a developed perspective view showing a conventional tape cassette container casing.
Figure 4:
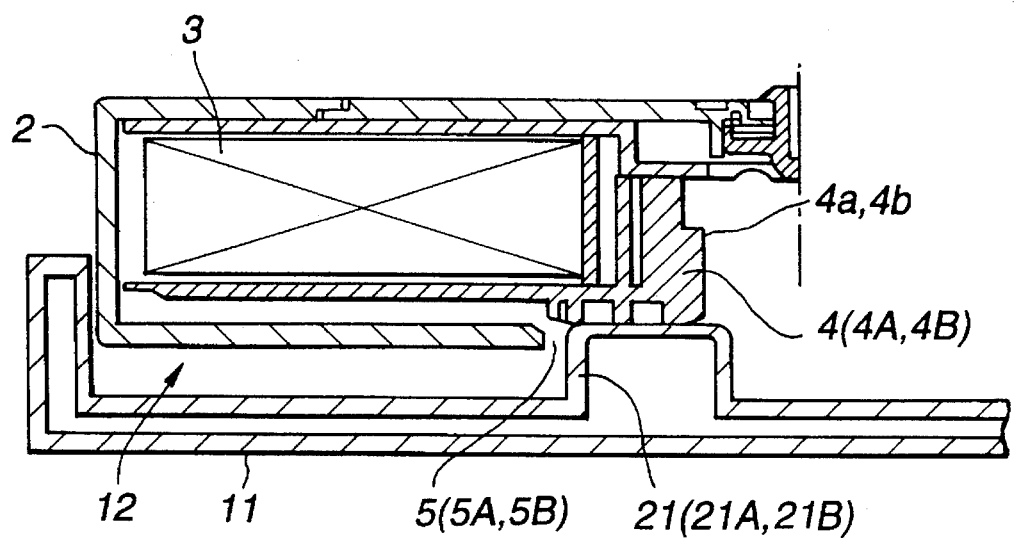
FIG. 4 is a schematic longitudinal cross-sectional view showing the mistaken housing state of the tape cassette in the tape cassette container casing.
Figure 5:
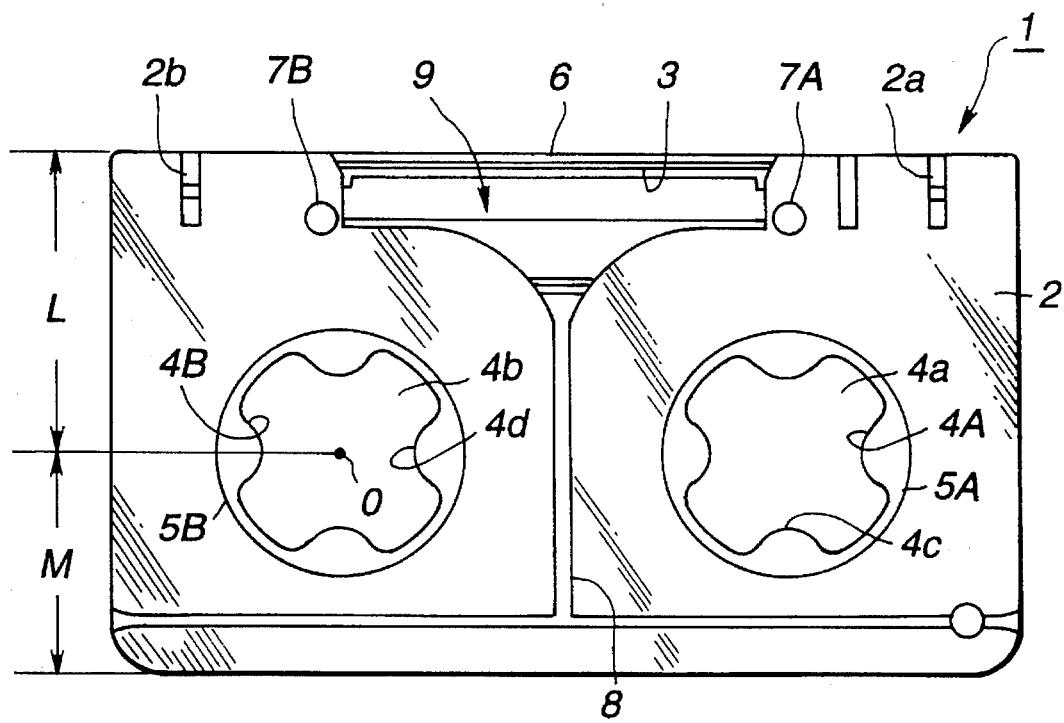
FIG. 5 is a back side view of a D-1 tape cassette for business use.
Figure 6:
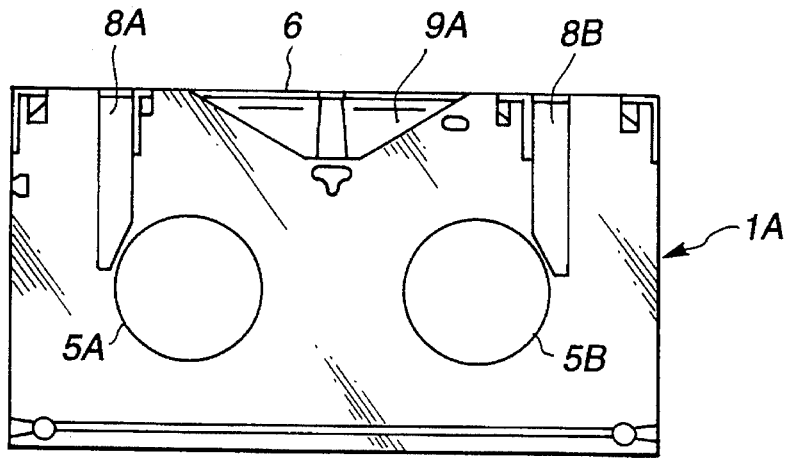
FIG. 6 is a back side view of a beta-cam type tape cassette for business use.
Figure 7:
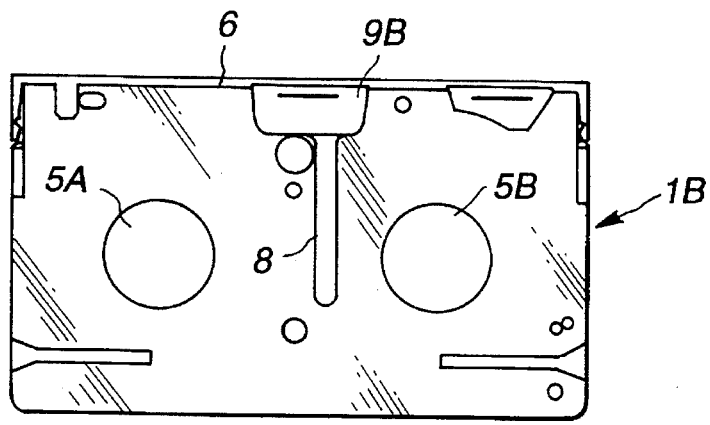
FIG. 7 is a back side view of a M-2 type tape cassette for business use.
Figure 8:
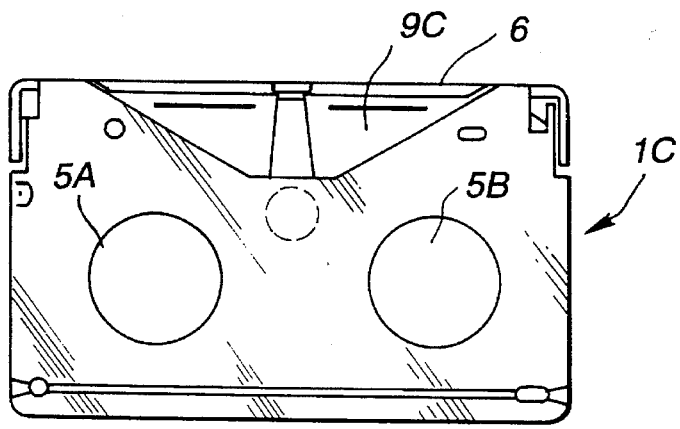
FIG. 8 is a back side view of a beta type tape cassette for household use.
Figure 9:
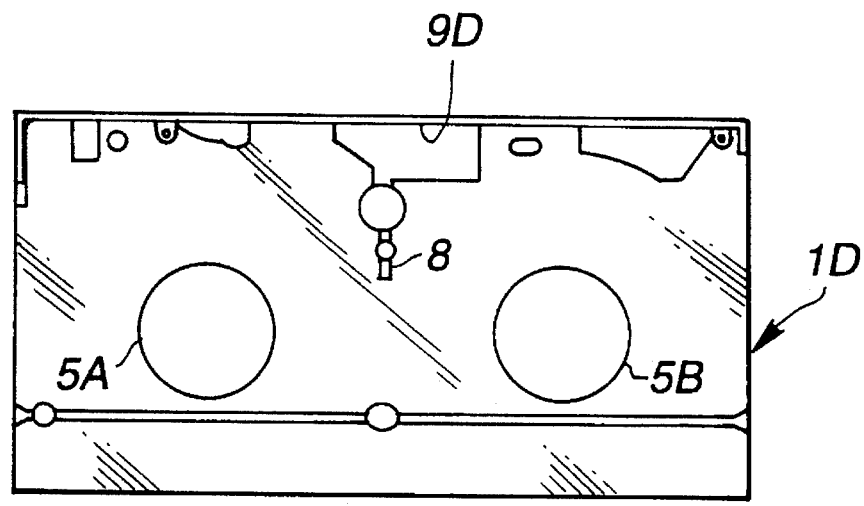
FIG. 9 is a back side view of a VHS type tape cassette for household use.
Figure 10:
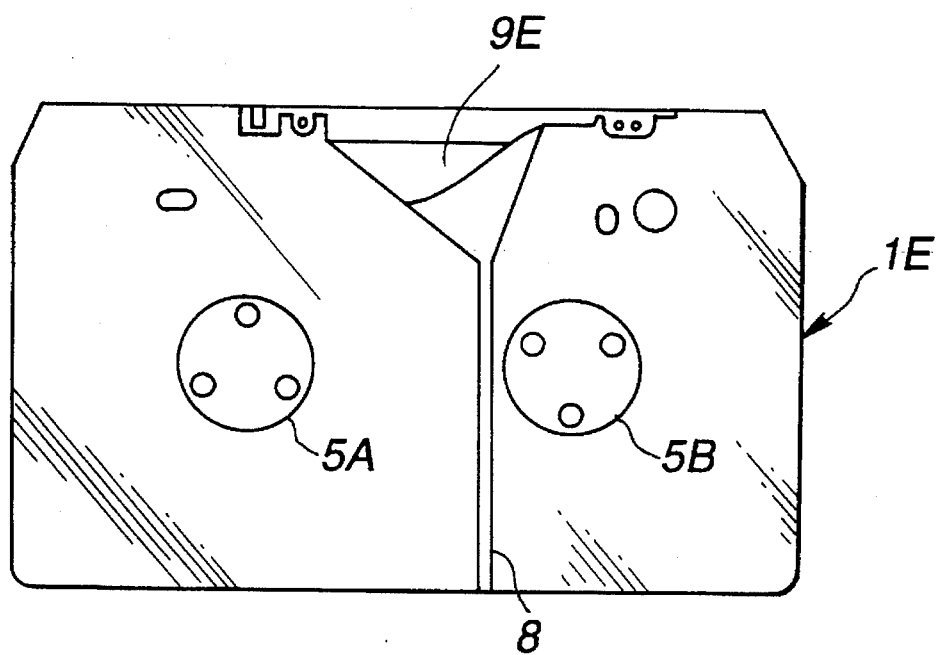
FIG. 10 is a back side view of a U-standard type tape cassette for household use.

Referring to the drawings, preferred embodiments of the present invention will be explained in detail. Similarly to the above-described tape cassette container casing 10, a tape cassette container casing 30 of an embodiment shown in FIGS. 1 and 2 is intended for containing a D-1 tape cassette 1 for business use for providing digital recording, and is formed of a hard synthetic material in order to provide a so-called hard casing. The tape cassette container casing 30 has its outer peripheral wall section of a double-wall construction for defining a inner spacing for increasing the strength of the casing and for providing the cushioning effect for preventing destruction of the tape cassette 1 due to impact caused by descent.

Referring to FIG. 1, a tape cassette container casing 30 includes a casing main member 31 having a rectangular tape cassette housing recess 32 having an opening size substantially equal to the outer size of a tape cassette 1, and a flexible hinge 33 formed as one with the casing main member 31 by reducing the thickness of an opened lateral section of the casing main member 31. The tape cassette container casing 30 also includes a lateral surface section 34 connecting to the hinge 33 and constituting the open lateral section and a lid 36 connecting to the lateral surface section 34 via a second flexible hinge 35 of a reduced thickness. The lid 36 has a tape cassette containing recess 37 having an opening size substantially equal to the outer size of the tape cassette 1.

A lateral surface section of the casing main member 31 opposite to the opened lateral surface section formed with the hinge 33 is also opened and is formed with an engagement section 39 having a wedge-shaped free end edge via a flexible thin-walled hinge 38. A lateral surface section of the lid 36 opposite to the lateral surface section thereof formed with the hinge 35 is formed with a mating engagement section having a wedge-shaped cross-section.

Consequently, by folding and abutting the lid 36 onto the casing main member 31 via the hinges 33, 35 for engaging the engagement section 39 with the mating engagement member 40, the tape container casing 30 having a tape cassette housing section H in the hermetically sealed state conforming to the outer profile of the tape cassette 1 contained therein as indicated by a chain-dotted line in FIG. 1 is formed by cooperation between the tape cassette containing recesses 32 and 37.

On the bottom surface of the tape cassette containing recess 32 on the casing main member 31 are formed a pair of reel holding protrusions 41A, 41B in a longitudinally spaced apart relation to each other. These reel holding protrusions 41A, 41B are formed as on with the bottom surface of the tape cassette housing recess 32 at a spacing from each other substantially equal to the distance between the tape reels 4A and 4B of the tape cassette 1. On the bottom surface of the tape cassette housing recess 37 of the lid 36 are upstandingly formed reel retention bosses 42A, 42B in association with the reel holding protrusions 41A and 41B, respectively.

Consequently, when the tape cassette 1 is housed in the tape cassette housing recess H constituted by the tape cassette housing recesses 32, 37 of the casing main member 31 and the lid 36, the reel holding protrusions 41A, 41B are engaged in the reel holes 4a, 4b of the tape cassette 1 for inhibiting idle rotation of the tape reels 4A, 4B. When the lid 36 is closed against the casing main member 31, the tape reels 4A, 4B are caused to bear against the reel holder of the tape cassette 1 for preventing floating of the tape cassette 1.

As in the case of the tape cassette containing casing 10, a length A from the center of each of the reel holding protrusions 41A, 41B formed on the tape cassette housing recess 32 of the casing main member 31 as far as the rear lateral surface section of the recess 32 formed with the hinge 33 is selected to be substantially equal to a length L from the center O of each of the reel holes 4a, 4b as far as the front side of the cassette casing 2, while a length B from the center of each of the reel holding protrusions 41A, 41B as far as the front lateral surface section formed with the hinge 38 is selected to be substantially equal to a length M between the center O and the rear side of the cassette casing 2.

On the bottom surface of the tape cassette containing recess 32 in the casing main member 31, there is integrally formed a mistaken housing inhibiting protrusion 43 in association with the mouth portion 9 of the tape cassette 1 for causing the tape cassette 1 to be housed within the tape cassette housing section H with pre-set orientation. That is, the mistaken housing inhibiting protrusion 43 is formed on the bottom surface of the tape cassette housing recess 32 so that a triangle C constituted by the mistaken housing inhibiting protrusion 43 and the reel holding protrusions 41A, 41B as apices is similar in profile to a triangle D constituted by the mouth portion 9 and the tape reels 4A, 4B of the tape cassette 1 as apices, as shown in FIG. 1.

The mistaken housing inhibiting protrusion 43 is made up of a base block portion 44 substantially co-extensive as the opening of the mouth portion 9 of the tape cassette 1 and a protrusion 45 adapted to be intruded into the mouth portion 9. As shown in FIG. 2, the protrusion 45 has a width substantially equal to the width of the mouth portion 9. Consequently, the tape cassette 1 housed within the tape cassette housing section H is prevented from being wobbled in the tape cassette housing recess H by the reel holding protrusions 41A, 41B engaged in the reel holes 4a, 4b and the mistaken housing inhibiting protrusion 43 fitting in the mouth portion 9.

Thus there is no risk of the outer peripheral surface of the tape cassette 1 being abraded against the inner wall surfaces of the tape cassette housing recesses 32, 37 to produce chips which tend to be deposited on the surface of the magnetic tape 3.

With the above construction of the tape cassette container casing, the tape cassette 1, having the length L from the center O of each of the reel holes 4a, 4b of the tape reels 4A, 4B as far as the front side of the cassette casing 2 connecting to the cassette lid 6 different from the length M from the center O as far as the rear side of the cassette casing 2, may be housed within the tape cassette housing section H by engaging the reel holding protrusions 41A, 41B in the reel holes 4a, 4b and by fitting the mistaken housing inhibiting protrusion 43 in the mouth portion 9. In other words, the tape cassette can be housed within the tape cassette container casing 30 only when the tape cassette 1 is loaded in the tape cassette housing section H with correct orientation.

Although the above-described tape cassette container casing is a container casing for the D-1 type tape cassette for business or professional use capable of digital recording, the present invention is not limited to this type of the tape cassette 1 and may be applied to a container casing for housing tape cassettes of different design statements, such as a tape cassette for household use. In such case, the mistaken housing inhibiting protrusion formed integrally on the bottom surface of the tape cassette housing recess is preferably shaped to conform to the mouth portion of the tape cassette which is to be in use.

In addition, although the tape cassette housing section H is defined by the tape cassette housing recess 32 formed in the casing main member 31 and the tape cassette housing recess 37 formed in the lid 38, it may occur that only the housing recess 32 formed in the casing main member 31 suffices, depending on the design thickness of the tape cassette housed within the tape cassette housing section H.

What is claimed is:

1. A tape cassette container casing comprising:

a casing main member having a first tape cassette housing recess having an opening size substantially equal to a size of a tape cassette;

a reel holding protrusion, formed on the bottom surface of the tape cassette housing recess of the casing main member, which is engaged in a reel hole of the tape cassette for inhibiting idle rotation of a tape reel having a magnetic tape wound thereon;

a mistaken housing inhibiting protrusion formed at a position on the bottom surface of the tape cassette housing of the casing main member registering with a mouth portion of the tape cassette for delimiting the loading direction of the tape cassette;

a lateral surface section formed as one with said casing main member via a first hinge;

a lid formed as one with said lateral surface section via a second hinge and comprising a second tape cassette housing recess having an opening size substantially equal to a size of a tape cassette;

an engagement section formed as one with the casing main member via a third hinge and having a wedge shaped free edge;

a mating engagement section having a wedge-shaped cross section formed as one with the lid for connecting with said engagement section when the casing is sealed closed; and an outer peripheral wall section with a double wall construction.

2. The tape cassette container casing as claimed in claim 1 wherein the mistaken housing inhibiting protrusion formed on the bottom surface of the tape cassette housing recess is similar in profile to the mouth portion of the tape cassette.

3. The tape cassette container casing as claimed in claim 1 wherein the mistaken housing inhibiting protrusion is integrally formed on the bottom surface of the tape cassette housing recess.

4. The tape cassette container casing as claimed in claim 1 wherein the mistaken housing inhibiting protrusion comprises a base block portion substantially similar in profile to the opening of the mouth portion and a portion adapted to be intruded into said mouth portion.

5. The tape cassette container casing as claimed in claim 4 wherein said portion adapted to be intruded is of a width substantially equal to the width of the mouth portion.

* * * * *